June 10, 1930.  C. E. SWENSON  1,762,673
CLUTCH DISK
Filed April 22, 1926
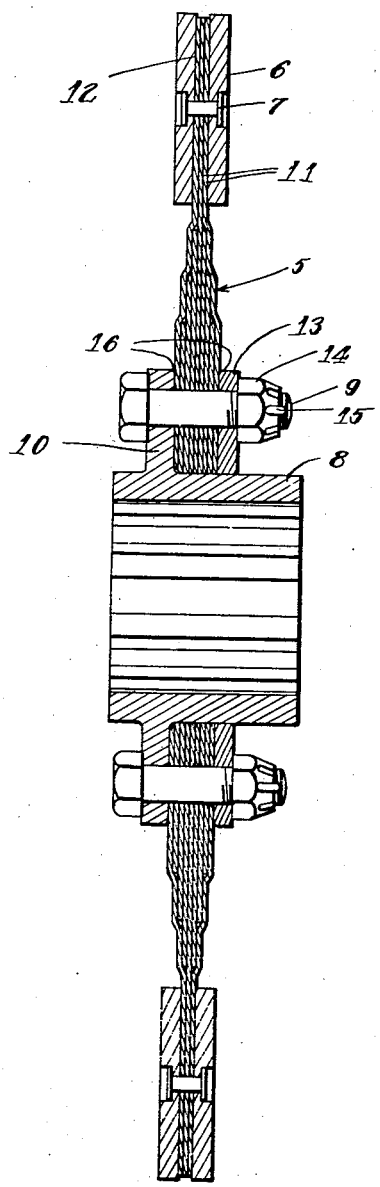
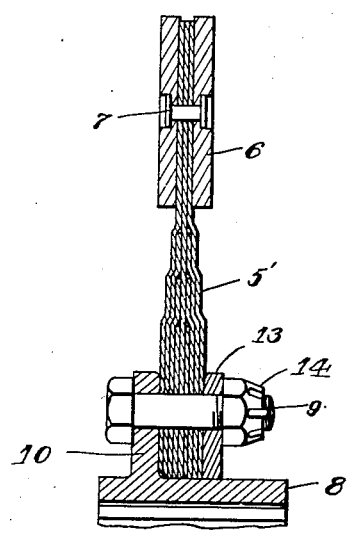
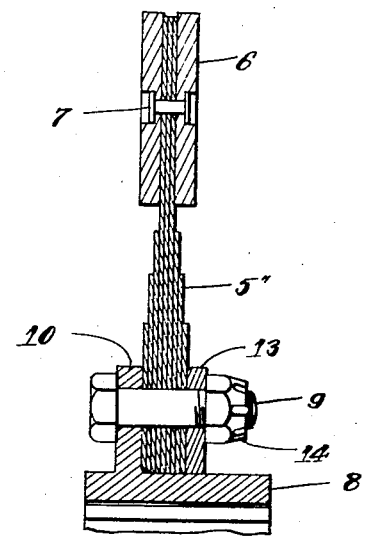
Inventor
Carl E. Swenson
By Wilson & McCanna
Attys.

Patented June 10, 1930

1,762,673

UNITED STATES PATENT OFFICE

CARL E. SWENSON, OF ROCKFORD, ILLINOIS, ASSIGNOR, BY DIRECT AND MESNE ASSIGNMENTS, TO MECHANICS UNIVERSAL JOINT COMPANY, OF ROCKFORD, ILLINOIS, A CORPORATION OF ILLINOIS

CLUTCH DISK

Application filed April 22, 1926. Serial No. 103,670.

This invention relates to friction disk clutches and is concerned with the provision of a novel clutch disk especially suited to the requirements of motor vehicles.

The principal object of the invention is to provide a clutch disk possessing torsional flexibility by reason of properties inherent in the material of the disk itself, whereby to smoothen the power take-up, eliminate chatter and vibration and give a more quietly operating clutch and motor without the increased cost and serious mechanical complications in structure necessitated in previous designs having a similar purpose in view.

Another object is to provide a clutch disk of the character referred to made of rubber composition material, preferably vulcanized fabric, built up to a heavy section for connection with the hub where the greatest strains are concentrated in the operation of the clutch and diminishing in section to a relatively thin annular peripheral portion whereon to mount the clutch pad material, the resulting structure being not only of the desired lightness but the principal weight being concentrated close to the axis of rotation so that inertia factors are reduced to a minimum.

The invention is disclosed in the accompanying drawing, wherein—

Fig. 1 is a medial section through a clutch disk made in accordance with the invention; and Figs. 2 and 3 are fragmentary sectional details of alternative constructions.

In friction clutches of the present type, motion is transmitted from a driving shaft or motor to the driven clutch disk 5 usually through two oppositely disposed pressure plates brought together under spring pressure to drive the disk by frictional engagement about the rim portion where the frictional material or clutch pads 6 are provided fixed to the disk in any suitable manner, as by means of rivets 7. The central collar 8, joined to the disk 5 by a series of bolts 9 extending through the annular flange 10 thereon, is arranged to have a splined connection with a driven shaft extending into the gear box of the transmission, in the usual manner. According to the present invention, I have provided the disk 5 of a rubber composition material, preferably vulcanized fabric, such as that sold under the trade name "Thermoid", which is a rubberized cotton fabric material. The body of the disk is composed of a plurality of plies or laminæ 11 bonded together by rubber in the vulcanizing process. The sections may be built into the composite body in several ways, as illustrated in the three views showing disks 5, 5', and 5''. In Fig. 1 the body of the disk comprises a series of sheets of fabric of different diameters bunched together giving a stepped cross-section with the thickest section at the hub and the thinnest section at the rim portion, the opposed faces of the body being formed of continuous pieces from the hub to the periphery of the disk giving a flush exterior surface as compared with the stepped exterior surface of the clutch disk 5'' in Fig. 3. Another alternative, somewhat approached by the form shown in Fig. 1, is to build up the body of the disk as in 5' where a central piece of the overall diameter has built onto its opposite sides pieces of increasing diameters each overlapping the outer edges of the next piece, as shown, with the outermost pieces continuous from the hub to the periphery of the disk to give a flush exterior surface similar to that secured in Fig. 1. Obviously the fabrication of the disk body may assume various forms without sacrificing the more important advantages secured by the present invention. It will be noted that the clutch pads 6 are mounted directly on the annular rim portion 12 which for this purpose is made of a uniform section for a portion of the radius of the disk inwardly from the periphery thereof. The connection with the hub 8 on the flange 10 preferably includes a ring 13 serving as a backing for the disk and avoiding mutilation thereof by the nuts 14 threading on the bolts 9. As illustrated, these nuts are preferably castellated to permit locking the same by the use of cotter pins 15 when the clutch disk is permanently clamped in assembled relation to the collar.

To avoid the likelihood of either the flange 10 or the ring 13 cutting into the fabric, the edges thereof are rounded, as indicated at 16.

From the foregoing description, it will be clear that the invention provides the desired degree of torsional flexibility by reason of properties inherent in the material of the disk itself. The use of the disk smoothens the power take-up, eliminates all noticeable chatter and vibration and results in a more quietly operating clutch and motor. The construction of the body of the disk with a heavy section at the hub and diminishing toward a relatively thin section at the rim is of decided advantage for the reasons that the maximum strength is thus afforded where the greatest strains are concentrated in the operation of the clutch while, at the same time, keeping the weight to a minimum consistent with such strength and throwing the principal weight toward the axis of rotation so that inertia factors are reduced to a minimum. There is also avoided the increased cost and mechanical complications in structure involved in previous designs having a similar purpose in view. It is obvious that the disk of the present invention is practically as simple in construction as the ordinary conventional type.

It is believed that the foregoing description conveys a clear understanding of the invention and of its purposes and advantages so that anyone skilled in the art to which the invention relates will readily appreciate the possible applications thereof. It will be understood that the invention is not limited to the particular forms illustrated but is capable of a wide range of modifications embraced within the spirit and scope of the appended claims.

I claim:

1. A clutch disk composed of resilient vulcanized fabric material from its connection with the hub to the periphery thereof and having frictional material mounted directly thereon on the rim portion thereof.

2. A clutch disk of rubber composition material built up to a heavy section at the center thereof and diminishing in section toward the rim portion thereof, said rim portion being of a uniform section a portion of the radius of the disk and providing a place for mounting friction clutch material.

3. A clutch disk of laminated fabric material vulcanized into a body thick in section at the hub portion where the greatest strains are concentrated in operation and decreasing in section to a relatively thin annular peripheral portion providing a place for mounting frictional material on the opposite faces of said disk.

4. A clutch disk composed of fabric material from its connection with the hub to the periphery thereof and having pads of clutch facing material mounted directly on the rim portion thereof, the fabric affording torsional flexibility for smoothness in operation and the pads affording the desired friction and wearing qualities for the transmission of the power.

5. A clutch disk as set forth in claim 4 wherein the fabric material is treated to stiffen the same and lend resilience to the torsional flexibility thereof.

6. A clutch disk as set forth in claim 4 wherein laminæ of fabric material are employed placed together to give a heavy section at the center thereof where the greatest strains are concentrated in operation and a relatively thin annular peripheral portion providing a place for mounting the pads thereon, the said material being treated to cause the laminæ to cohere and form a stiff body, the said treatment serving also to lend resilience to the torsional flexibility of the material.

In witness of the foregoing I affix my signature.

CARL E. SWENSON.